(12) United States Patent
Kim et al.

(10) Patent No.: US 12,145,559 B2
(45) Date of Patent: Nov. 19, 2024

(54) CONTROL METHOD FOR DISTRIBUTION OF BRAKING FORCE OF AUTONOMOUS VEHICLE

(71) Applicants: Hyundai Motor Company, Seoul (KR); Kia Corporation, Seoul (KR)

(72) Inventors: In-Su Kim, Anyang-Si (KR); Myung-Ki Yeom, Incheon (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 485 days.

(21) Appl. No.: 17/526,897

(22) Filed: Nov. 15, 2021

(65) Prior Publication Data

US 2023/0009196 A1    Jan. 12, 2023

(30) Foreign Application Priority Data

Jul. 9, 2021    (KR) .......................... 10-2021-0090531

(51) Int. Cl.
*B60T 8/1766*    (2006.01)
*B60T 8/172*    (2006.01)
(Continued)

(52) U.S. Cl.
CPC ............ *B60T 8/1766* (2013.01); *B60T 8/172* (2013.01); *B60T 8/1755* (2013.01); *B60T 13/74* (2013.01); *G01G 19/08* (2013.01)

(58) Field of Classification Search
CPC ...... B60T 8/1766; B60T 8/172; B60T 8/1755; B60T 13/74; B60T 7/22; B60T 2240/06;
(Continued)

(56) References Cited

U.S. PATENT DOCUMENTS

2022/0242449 A1* 8/2022 Sakayori ........... B60W 60/0013
2023/0137189 A1* 5/2023 Oh ........................ B60W 10/04
                                                            701/80

FOREIGN PATENT DOCUMENTS

KR    10-2019-0049176    5/2019
WO    WO2003/044472    5/2003

OTHER PUBLICATIONS

WO document No. WO 2020/261724 to Sakayori et al published on Dec. 30, 2020.*

* cited by examiner

*Primary Examiner* — Pamela Rodriguez
(74) *Attorney, Agent, or Firm* — Morgan, Lewis & Bockius LLP

(57) ABSTRACT

A control method for distribution of braking force of an autonomous vehicle may include a vertical load determination step in which a controller is configured to recognize an object existing in an interior of the vehicle and recognizes data of at least one among a position in the vehicle, a size, volume, density, weight, and center of gravity of the corresponding object, and determines a vertical load applied to each wheel of the vehicle according to the recognized data, wherein the controller transmits data of the determined vertical load of each wheel to a brake controller electrically connected to the controller, and the brake controller 40 determines an amount of the distribution of the braking force for each wheel of the vehicle according to the received data of the vertical load and drives a brake actuator electrically connected to the brake controller according to the determined amount of the distribution of the braking force.

13 Claims, 7 Drawing Sheets

(51) Int. Cl.
*B60T 8/1755* (2006.01)
*B60T 13/74* (2006.01)
*G01G 19/08* (2006.01)

(58) Field of Classification Search
CPC ..... G01G 19/08; G01G 19/086; B60W 10/18; B60W 60/001; B60W 40/13; B60W 2420/403; B60W 2530/10
See application file for complete search history.

$$I\ddot{\theta} = hma_x$$

$$h = \frac{I\ddot{\theta}}{ma_x}$$

l: MOMENT, Θ: ANGLE, h: HEIGHT, m: MASS, a: ACCELERATION, w: LENGTH OF BASE SIDE

CONTROL METHOD FOR DISTRIBUTION OF BRAKING FORCE OF AUTONOMOUS VEHICLE

CROSS-REFERENCE TO RELATED APPLICATIONS

The present application claims priority to Korean Patent Application No. 10-2021-0090531, filed on Jul. 9, 2021, the entire contents of which is incorporated herein for all purposes by this reference.

BACKGROUND OF THE INVENTION

Field of the Invention

The present invention relates to a control method for distribution of braking force of an autonomous vehicle, and more particularly, to a control method, in which a controller is configured to recognize an object existing in the interior of a vehicle and recognizes data of at least one among a position in the vehicle, a size, volume, density, weight, and center of gravity of the corresponding object, and calculates a vertical load applied to each wheel of the vehicle according to the recognized data in a vertical load calculating step, and the controller transmits data of the calculated vertical load of each wheel to a brake controller electrically connected to the controller, and the brake controller calculates an amount of the distribution of the braking force for each wheel of the vehicle according to the received data of the vertical load and drives a brake actuator electrically connected to the brake controller according to the calculated amount of distribution of the braking force.

Description of Related Art

In general, in a vehicle, a seat is fixed, and there are few sections in which passengers can move while driving. Furthermore, it is possible to easily recognize whether the passengers of the vehicle are accommodated on the seats by use of a sensor signal of a load sensor provided in the seat.

That is, since the internal structure of the general vehicle is generally uniform, the amount of variation in the load in the interior of the vehicle is small, so that it is easy to recognize the load applied to each wheel of the vehicle.

For example, in the case of a front-wheel driving vehicle, a vertical load of a rear wheel moves to the front wheels in proportion to the deceleration at the time of the braking of the vehicle, so that the vertical load applied to the front wheel is greater than the vertical load applied to the rear wheel.

Accordingly, a larger vertical load is formed on the front wheel of the front-wheel driving vehicle during the braking of the vehicle, so that the braking force of the front wheel is greater than the braking force of the rear wheel, and conversely, the braking force of the rear wheel is small. This is because, when the vertical load of the rear wheel is small, but the braking force is large, the rear wheel locking phenomenon occurs, causing unstable driving of the vehicle.

However, an autonomous vehicle, which is being recently developed, is the vehicle that receives information related to a section in which the vehicle is operating from a Global Positioning System (GPS) module, a camera, radar, LiDAR, navigation device, and autonomously performs driving and braking along a road, and the autonomous vehicle does not require the direct driving of a passenger, so that the passenger may perform various activities inside the vehicle while the vehicle travels.

For example, the passenger may eat food inside the autonomous vehicle, or install a bed in the interior of the vehicle and sleep on the bed, so that a vertical load applied to each wheel of the vehicle is sharply changed, and the present phenomenon is very different from the case where the amount of variation of a vertical load generated from a uniform structure in which a seat of a general vehicle is fixed to a specific position and applied to the wheel is small.

Accordingly, it is impossible to accurately recognize the change in the vertical load in the interior of the autonomous vehicle, so that it is difficult to control each wheel of the vehicle with optimum braking force, which may cause unstable driving of the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a control method for optimally adjusting braking force required for a wheel by accurately measuring a vertical load applied to the wheel of an autonomous vehicle.

Various aspects of the present invention are directed to providing a control method for distribution of braking force of an autonomous vehicle, in which a controller is configured to recognize an object existing in an interior of a vehicle and recognizes data of at least one among a position in the vehicle, a size, volume, density, weight, and center of gravity of the corresponding object, and determines a vertical load applied to each wheel of the vehicle according to the recognized data in a vertical load determining step, and the controller is configured to transmit controller is configured to transmit data of the determined vertical load of each wheel to a brake controller electrically connected to the controller, and the brake controller is configured to determine an amount of the distribution of the braking force for each wheel of the vehicle according to the received data of the vertical load and drives a brake actuator electrically connected to the brake controller according to the determined amount of the distribution of the braking force.

The control method for distribution of braking force of an autonomous vehicle of the present invention including the foregoing configuration exhibits an effect of improving braking stability of the vehicle by accurately determining a vertical load applied to each wheel of the autonomous vehicle.

The control method for distribution of braking force of an autonomous vehicle of the present invention including the foregoing configuration exhibits an effect of preventing safety accidents by forecasting the risk that an object mounted inside the vehicle falls down and controlling acceleration and deceleration of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
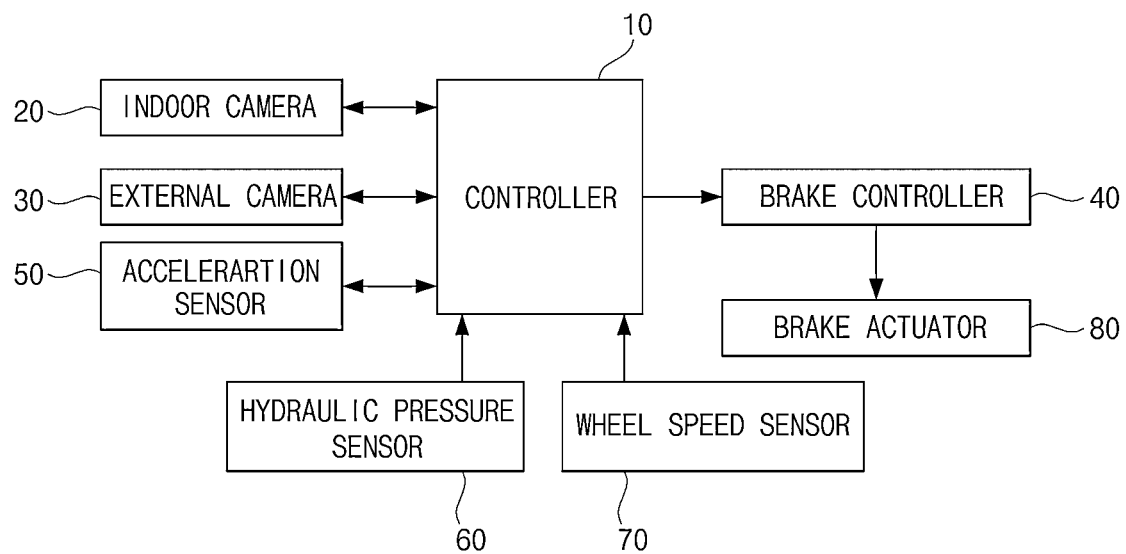
FIG. 1 is a schematic diagram illustrating a system for performing a control method for distribution of braking force of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of a control method for distribution of braking force of an autonomous vehicle according to various exemplary embodiments of the present invention will be described in detail with reference to the drawings. Terms or words used hereinafter shall not be interpreted to be limited as general or lexical meanings, and on the principle that the inventor can appropriately define a concept of a term for describing the present invention by the best method, the terms or the words shall be interpreted as a meaning and a concept corresponding to the technical spirit of the present invention.

FIG. 1 is a schematic diagram illustrating a system for performing a control method for distribution of braking force of the present invention.

Referring to the drawing, the control method for distribution of braking force of the present invention is implemented by a system including an indoor camera 20 provided in a vehicle to capture an image of the interior of the vehicle, an external camera 30 provided in the vehicle to capture an image of an external environment outside the vehicle, such as the front side of the vehicle, a brake controller 40 controlling a brake of the vehicle, an acceleration sensor 50 measuring an acceleration of the vehicle, a hydraulic pressure sensor 60 measuring a hydraulic pressure for operating a brake of the vehicle, a wheel speed sensor 70 measuring a speed of each wheel of the vehicle, a brake actuator 80 which operates the brake under the control of the brake controller 40, and a controller 10 which analyzes signals received from the indoor camera 20, the external camera 30, the acceleration sensor 50, the hydraulic pressure sensor 60, the wheel speed sensor 70, and the brake actuator 80 and drives the brake controller 40.

The controller 10 recognizes data of at least one item among locations in the vehicle, sizes, volume, density, weight, and center of gravity of objects (including people and articles) existing in the interior of the vehicle by use of the indoor camera 20.

The controller 10 determines a vertical load of each wheel by use of the recognized data of at least one of the position in the vehicle, size, volume, density, weight, and center of gravity of the corresponding object. The unit of the vertical load is N (newton), that is, it is defined as the force required to accelerate an object having a mass of 1 kg by 1 meter per second squared (kg×m×sec$^2$).

The controller 10 transmits data of the determined vertical load of each wheel to the brake controller 40, and the brake controller 40 receiving the data of the vertical load determines the amount of distribution of the braking force of each wheel so as not to incur a locking phenomenon in each wheel of the vehicle according to the change amount in the vertical load of the travelling vehicle and drives the brake actuator 80 according to the determined amount of the distribution of the braking force.

The unit of the braking force is also N (Newton) that is the unit of the vertical load.

The controller 10 detects an object, such as a cup, which loses its center and is easily toppled over or fallen according to the driving of the vehicle, by use of the indoor camera 20, and controls acceleration and deceleration of the vehicle to prevent the object from toppling over or falling down from an original position thereof.

Figure 2:
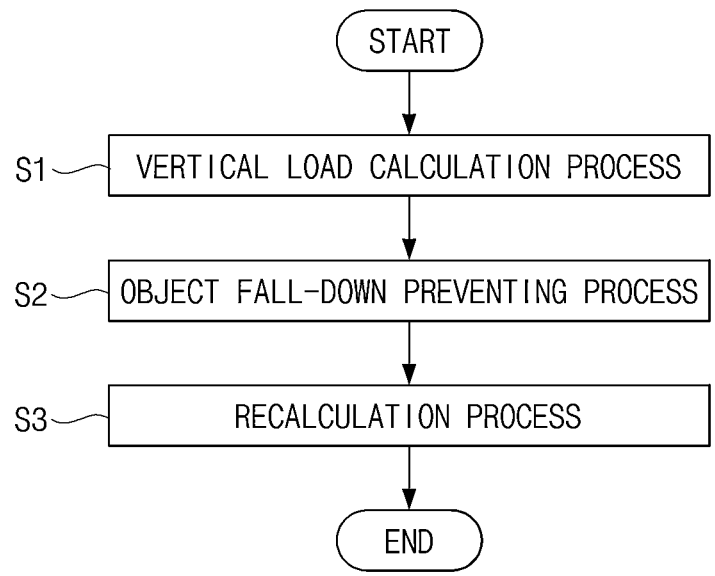
FIG. 2 is a flowchart illustrating the control method for distribution of braking force of the present invention.

FIG. 2 is a flowchart illustrating the control method for distribution of braking force of the present invention.

Referring to the drawing, the control method for distribution of braking force of the present invention includes a vertical load determining step S1 in which the controller 10 recognizes an object existing in the interior of the vehicle by use of the indoor camera 20 and recognizes data of at least one item among a position in the vehicle, a size, volume, density, weight, and center of gravity of the corresponding object, and determines a vertical load applied to each wheel of the vehicle according to the recognized data.

Herein, the object recognized by the indoor camera 20 includes a person and an article.

In the vertical load determining step S1, the controller 10 may check whether the object has moved inside the vehicle in real time by use of the indoor camera 20, and recognize the change amount in the vertical load applied to each wheel of the vehicle according to the result of the checking.

In the vertical load determining step S1, the controller 10 may determine a limit value of the braking force applied to each wheel of the vehicle according to data of the determined vertical load and a friction coefficient of a road surface on which the vehicle is travelling.

The controller 10 transmits data of the determined vertical load of each wheel to the brake controller 40, and the brake controller 40 determines the amount of distribution of the braking force for each wheel of the vehicle according to the received data of the vertical load and drives the brake actuator 80 according to the determined amount of the distribution of the braking force.

Next, the control method for distribution of braking force of the present invention further includes an object fall-down preventing step S2, in which the controller 10 recognizes an object existing in the interior of the vehicle by use of the indoor camera 20, and when the recognized object is an object having a possibility of falling down which may topple over or drop inside the vehicle, the controller 10 controls acceleration and deceleration of the vehicle to prevent the corresponding object from falling down from an original position thereof.

The controller 10 may determine an acceleration and a deceleration of the vehicle to prevent the easily falling objects in the vehicle from being shaken and falling, and determines braking force of each wheel of the vehicle according to the determined acceleration and the determined deceleration.

The controller 10 recognizes whether the contents, such as a liquid, in a bow, such as a cut or plate, existing in the vehicle overflow from the bowl, and determines an acceleration and a deceleration of the vehicle to prevent the content from overflowing, and determines braking force of each wheel of the vehicle according to the determined acceleration and the determined deceleration.

Next, the control method for distribution of braking force of the present invention further includes a recalculating step S3, in which the controller 10 drives the brake actuator 80 according to the amount of distribution of the braking force of each wheel of the vehicle according to the vertical load of each wheel determined in the perpendicular load determining step S1, and when a locking phenomenon occurs in at least one wheel of the vehicle while the vehicle travels, the controller 10 re-recognizes data of a weight of an object that affects the vertical load of the corresponding wheel, determines a vertical load applied to each wheel of the vehicle according to the re-recognized weight of the corresponding object, determines the amount of distribution of the braking force of each wheel to prevent the locking phenomenon from occurring in the corresponding wheel, and drives the brake actuator 80 according to the determined amount of the distribution of the braking force.

Hereinafter, an exemplary embodiment of the control method for distribution of braking force of the present invention configured as described above will be described.

Figure 3:
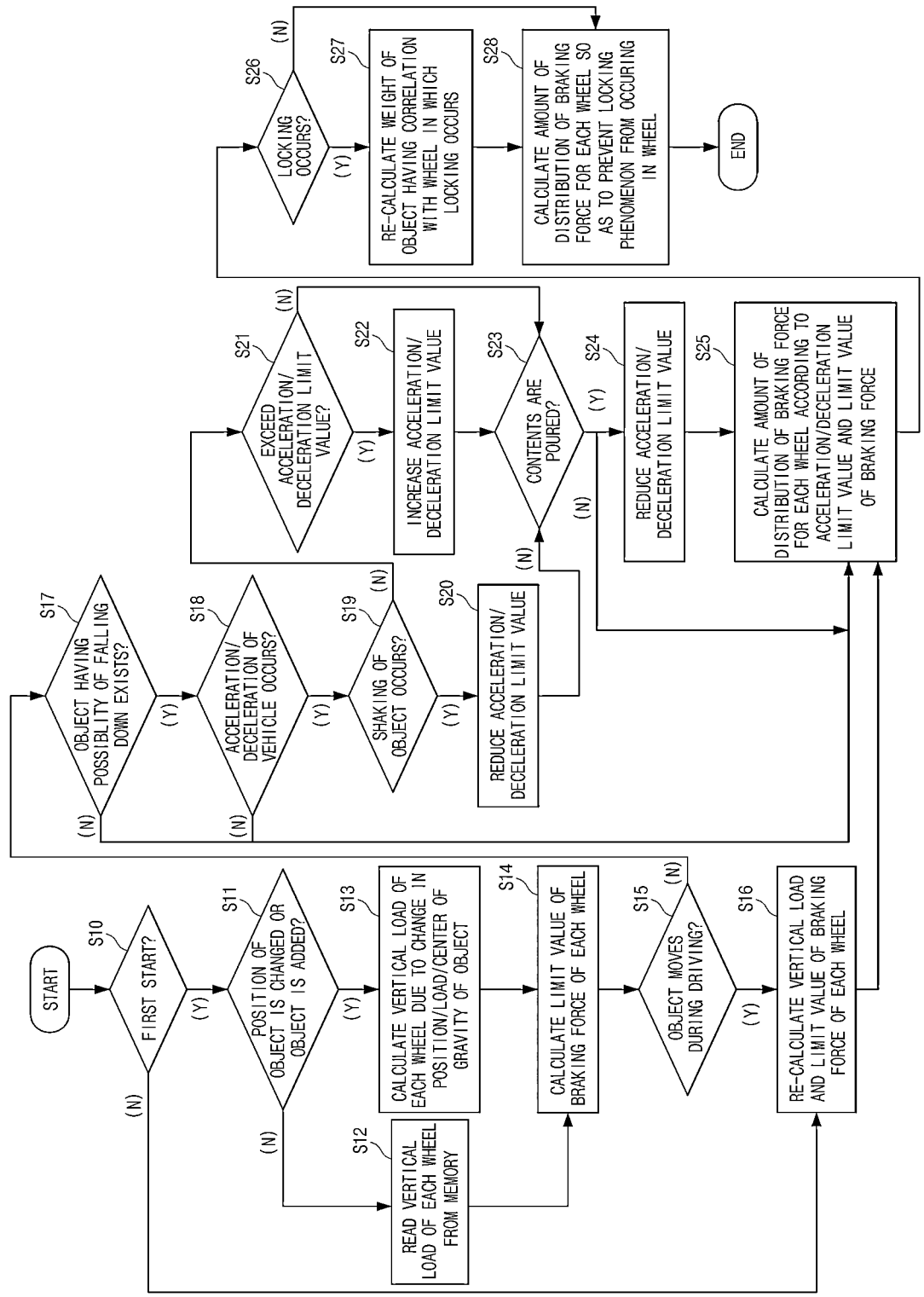
FIG. 3 is a flowchart of an exemplary embodiment of the control method for distribution of braking force of the present invention.

FIG. 3 is a flowchart of an exemplary embodiment of the control method for distribution of braking force of the present invention.

The control method for distribution of braking force according to the exemplary embodiment of the present invention, which is to be described below, is implemented by a system including an indoor camera 20 provided in a vehicle to capture an image of the interior of the vehicle, an external camera 30 provided in the vehicle to capture an image of an external environment outside the vehicle, such as the front side of the vehicle, a brake controller 40 controlling a brake of the vehicle, an acceleration sensor 50 measuring an acceleration of the vehicle, a hydraulic pressure sensor 60 measuring a hydraulic pressure for operating a brake of the vehicle, a wheel speed sensor 70 measuring a speed of each wheel of the vehicle, a brake actuator 80 which operates the brake under the control of the brake controller 40, and a controller 10 which analyzes signals received from the indoor camera 20, the external camera 30, the acceleration sensor 50, the hydraulic pressure sensor 60, the wheel speed sensor 70, and the brake actuator 80 and drives the brake controller 40.

In an exemplary embodiment of the present invention, the controller 10 and the brake controller 40 may be integrated into a single controller.

Hereinafter, the exemplary embodiment of the present invention will be described with reference to the drawing. First, when the vehicle initially starts (S10), the controller 10 determines whether a position of an object (including a person and an article) existing in the interior of the vehicle is changed or a new object is added (S11).

In the instant case, for the determination in operation S11, the controller 10 may check the type of corresponding object by performing communication with the corresponding object by a Radio-Frequency Identification (RFID) method or an Internet of Things (IOT) method.

In the instant case, the controller 10 may preferentially recognize the type of the corresponding object by the RFID method or the IOT method, and when there is no information transmitted by the RFID method or the IOT method, the controller 10 may check the type of object from image information of the corresponding object photographed by the indoor camera 20.

The determination in operation S11 may be performed only once when the vehicle is started for the first time in operation S10, and may not be performed thereafter.

This is for, when the position or weight of the existing object existing in the interior of the vehicle is changed or a new object is added at the time of the first start-up, determining a vertical load by determining the position, weight, and center of gravity of only the changed or added object, and summing the determined positon, weight, and center of gravity and the data of the existing object existing in the interior of the vehicle.

Next, when the position of the object (including the person and the article) existing in the interior of the vehicle is not changed or the new object is not added as the result of the determination in operation S11, the controller 10 reads the most recent data of the vertical load of each wheel stored in an interlocked memory (S12).

In the meantime, when the position of the object (including the person and the article) existing in the interior of the vehicle is changed or the new object is added as the result of the determination in operation S11, the controller 10 recognizes data of positions, weights, and centers of gravity in the vehicle for all objects existing in the interior of the vehicle, and determines a vertical load applied to each wheel of the vehicle according to the recognized data (S13).

In the instant case, the center of gravity may be recognized according to the methodology of a thesis (title: Center of Mass for Balance Evaluation Using Convolutional Neutral Networks) (2019 IEEE International Conference on Healthcare Informatics (ICHI)) on the method of determining center of gravity of an object by use of Convolutional Neural Networks (CNN) method, which is one of the methods of recognizing an object by use of artificial intelligence, as a methodology for recognizing the center of gravity of the object.

The controller 10 determines a limit value of braking force of each wheel of the vehicle according to the determined vertical load for each wheel (S14).

Figure 4:
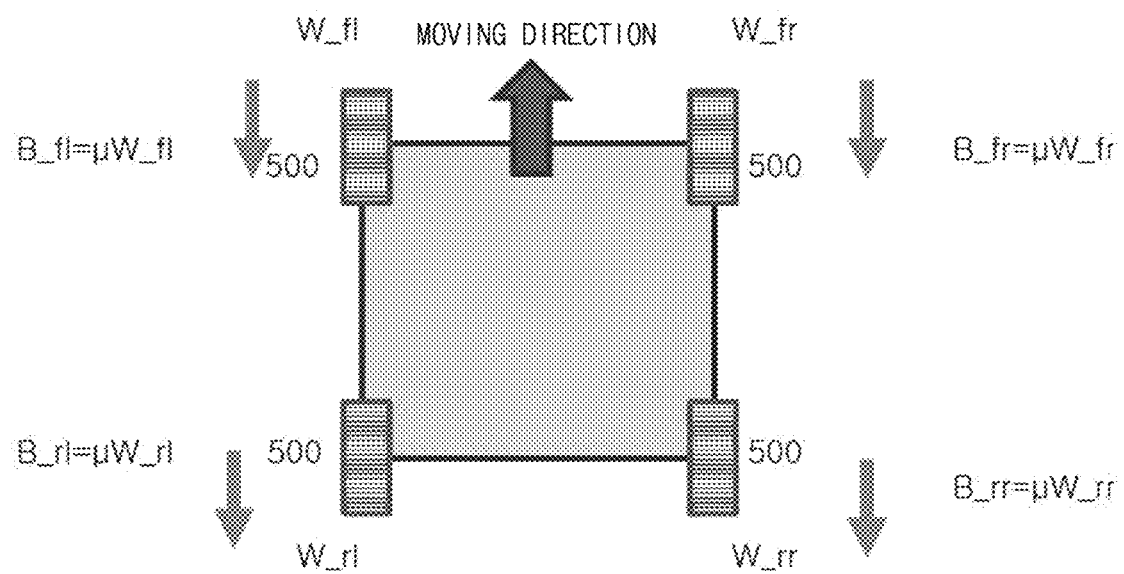
FIG. 4 is a schematic diagram illustrating a determination of a limit value of braking force of a wheel of the control method for distribution of braking force of the present invention.

In the instant case, as illustrated in the schematic diagram of FIG. 4, the controller 10 may determine a limit value B of braking force of each wheel by assuming both the vertical load W and the friction coefficient μ of the road surface as variables in operation S14.

That is, referring to FIG. 4, with respect to a moving direction (an upper portion of the drawing) of the vehicle, a limit value of the braking force of the front-left wheel of the vehicle is determined as $B\_fl=\mu W\_fl$, a limit value of the braking force of the front-right wheel of the vehicle is determined as $B\_fr=\mu W\_fr$, a limit value of the braking force of the rear-left wheel of the vehicle is determined as $B\_rl=\mu W\_rl$, and limit value of the braking force of the rear-right wheel of the vehicle is determined as $B\_rr=\mu W\_rr$.

Even though a target deceleration of the vehicle requires a deceleration greater than the limit value of the braking force, the limit value of the braking force limits the deceleration to or below the limit value B of the braking force.

Next, the controller 10 determines whether the object located inside the vehicle moves while the vehicle travels (S15).

In the determination whether the object moves while the vehicle travels, as described above, whether the corresponding object moves may be determined based on the information transmitted by the RFID method or the IOT method, and whether the corresponding object moves may be determined based on image information of the corresponding object photographed by use of the indoor camera 20 when there is no information transmitted by the RFID method or the IOT method.

When the controller concludes that the object moves while the vehicle travels S15, the vertical load may be changed due to the moving object, which may affect the vertical load of each wheel and the limit value of the braking force, so that the controller 10 recognizes data of positions, weights, and centers of gravity in the vehicle for all objects existing in the interior of the vehicle, re-calculates a vertical load applied to each wheel of the vehicle according to the recognized data, and re-calculates a limit value of the braking force of each wheel of the vehicle according to the vertical load (S16), and moves to operation S25 of determining the amount of distribution of the braking force according to the limit values of the acceleration, the deceleration, and the braking force.

In the meantime, operations S10 to S16 correspond to the vertical load determining step S1.

Subsequently, when the object does not move when the vehicle travels S15, the controller 10 determines whether there is an object which may topple over or fall (that is, an object with the possibility of falling) in the interior of the vehicle by use of the indoor camera 20 (S17).

When there is the object which may fall as the result of the determination in S17, the controller 10 receives a sensor signal of the acceleration sensor 50 that measures an acceleration of the vehicle and determines whether acceleration or deceleration of the vehicle occurs (S18).

When there is no object which may fall as the result of the determination in S17, the controller 10 progresses to operation S25 of determining the amount of distribution of the braking force according to the limit values of the acceleration and the deceleration and the limit value of the braking force.

When the acceleration or the deceleration of the vehicle occurs as the result of the determination of operation S18, the controller 10 determines whether shaking of the object has occurred due to the acceleration or the deceleration of the vehicle (S19).

When the vehicle does not accelerate or decelerate as the result of the determination in S18, the controller 10 progresses to operation S25 of determining the amount of distribution of the braking force according to the limit values of the acceleration and the deceleration and the limit value of the braking force.

The reason why it is necessary to determine whether the shaking of the object has occurred in operation S19 is to check a shape of an object which is easy to fall down and monitor shaking of the corresponding object in real time by use of the indoor camera 20 because the braking force is controlled to the extent that locking of the wheel does not occur for each wheel, but the object, such as a glass cup, in the interior of the vehicle may fall down and cause a danger according to the braking force, and it is more dangerous if there are contents inside the glass cub.

In the instant case, the determination whether the shaking of the object has occurred in operation S19 may be performed by recognizing the center of gravity of the object.

Figure 5A:
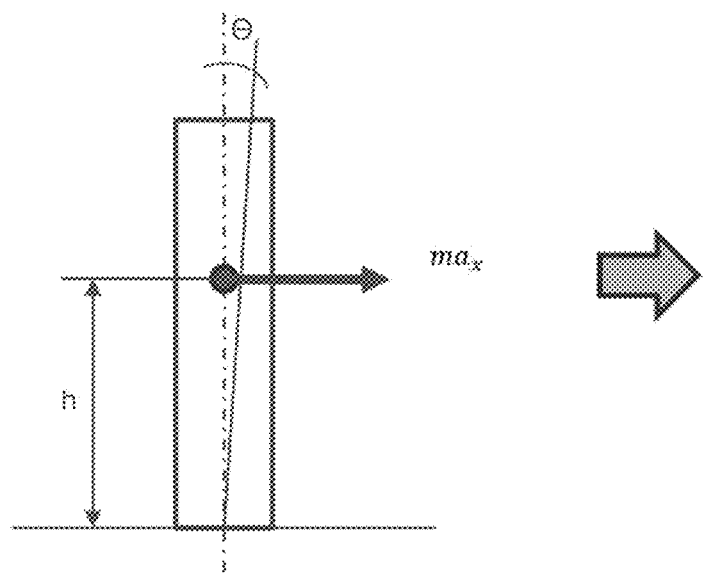
FIG. 5A and FIG. 5B are schematic diagrams illustrating a determination of the center of gravity of an object mounted inside the vehicle in the control method for distribution of braking force of the present invention.
Figure 5B:
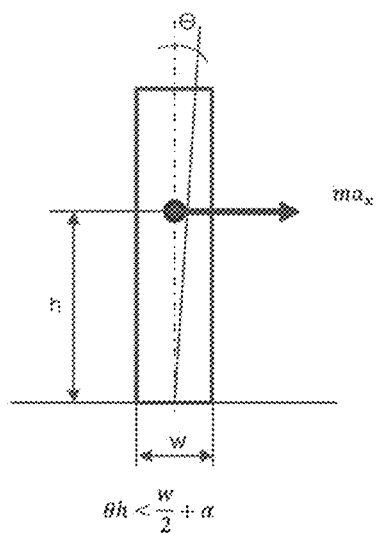

Referring to the schematic diagram of FIG. 5A and FIG. 5B, the method of recognizing the shaking of the object by use of the indoor camera 20 is used.

Referring to the drawing, an angular velocity of rotation with respect to the shaking of the object may be measured by use of a camera. By use of the value of the angular velocity of rotation, the center of gravity h may be determined as illustrated in the state diagram in FIG. 5A at the left side thereof.

In the instant case, for the degree of falling of the object, a value of preventing the object from falling may be obtained by adding a margin for the estimation error to the length w of the base side thereof.

That is, as illustrated in the state diagram of FIG. 5B at the right side, an angle (Θ) of the shaking of the object is determined as a shaking limit value of the object.

Next, when the shaking of the object has occurred in operation S19, the controller 10 reduces the predetermined limit values of the acceleration and the deceleration (hereinafter, collectively referred to as "the acceleration/deceleration limit value") (S20).

The reason for this is to reduce the acceleration or the deceleration of the vehicle because the object may topple over when the shaking of the object occurs.

The acceleration/deceleration limit value is determined by checking the shaking of the object by use of the indoor camera 20, and the limit value of the deceleration of the exemplary embodiment of the present invention is determined as described below.

1) Determine Deceleration Limit Value

Initial Deceleration Limit Value of the Vehicle $a\_b_{ini}=(B\_fl+B\_fr+B\_rl+B\_rr)$, wherein $a\_a_{ini}$ is an initial acceleration limit value of the vehicle.

That is, an initial value of the predetermined deceleration limit value ($a\_a_{ini}$) utilizes the limit value of the braking force using the vertical load.

2) Change the Deceleration of the Vehicle in Real Time According to the Change Amount in Vertical Load of the Vehicle $$a\_b=a\_b_{ini}+\Delta a$$

wherein Δa is change amount in deceleration according to the change amount in vertical load and the shaking of the object.

In the meantime, in the determination of the acceleration limit value, the initial acceleration limit value of the vehicle ($a\_a_{ini}$) is selected according to the size and center of gravity of the object by use of the indoor camera 20, and the acceleration is increased or reduced according to whether the shaking of the object occurs at the time of the occurrence of the acceleration of the vehicle.

Next, when the shaking of the object does not occur in operation S19, the controller 10 determines whether the acceleration or the deceleration of the vehicle exceeds the predetermined acceleration/deceleration limit value (S21).

When the controller concludes that the acceleration of the vehicle exceeds the predetermined acceleration limit value or the deceleration of the vehicle exceeds the predetermined deceleration limit value S21, the controller 10 increases the acceleration/deceleration limit value (S22).

Next, after the acceleration/deceleration limit value is reduced in operation S20 or the acceleration/deceleration limit value is increased in operation S22, the controller 10 determines whether the a content contained in the object that has the possibility of toppling over or falling down in the interior of the vehicle are poured (S23).

In the determination of operation S23, whether the contents contained in the object is poured is determined by analyzing the image of the object photographed by use of the indoor camera 20.

When the contents are poured from the object as the result of the determination in operation S23, the controller 10 reduces the acceleration/deceleration limit value (S24), and determines the amount of distribution of the braking force according to the reduced acceleration/deceleration limit value and the limit value of the braking force (S25).

When the contents are not poured from the object as the result of the determination of operation S23, the controller 10 does not perform the operation S24 of reducing the acceleration/deceleration limit value and determines the amount of distribution of the braking force according to the acceleration/deceleration limit value and the limit value of the braking force of operation S25.

Figure 6A:
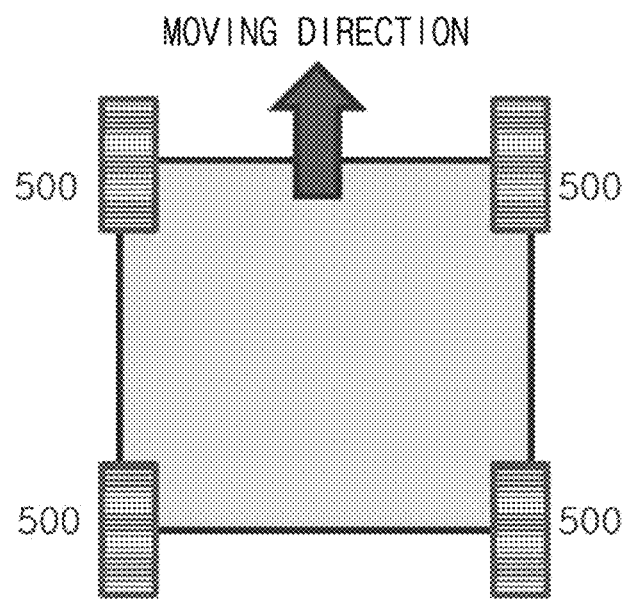
FIG. 6A, FIG. 6B, FIG. 6C and FIG. 6D are schematic diagrams illustrating an example of the distribution of braking force according to a vertical load of the control method for distribution of braking force of the present invention.
Figure 6B:
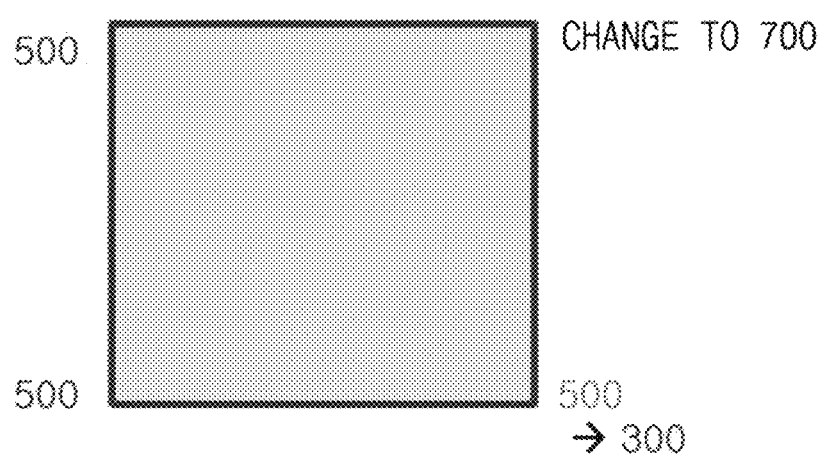

FIG. 6A, FIG. 6B, FIG. 6C and FIG. 6D are schematic diagrams illustrating an example of the distribution of braking force according to a vertical load of the control method for distribution of braking force of the present invention, and referring to the drawing, as illustrated in FIG. 6A, when it is assumed that initial braking force of every wheel is 500 N, and when the braking force of the front-right wheel of the vehicle is changed to 700 N as illustrated in FIG. 6B, to uniformly adjust the braking force of the right wheels and the left wheels of the vehicle, the braking force of the rear-right wheel of the vehicle is decreased to 300 N.

Figure 6C:
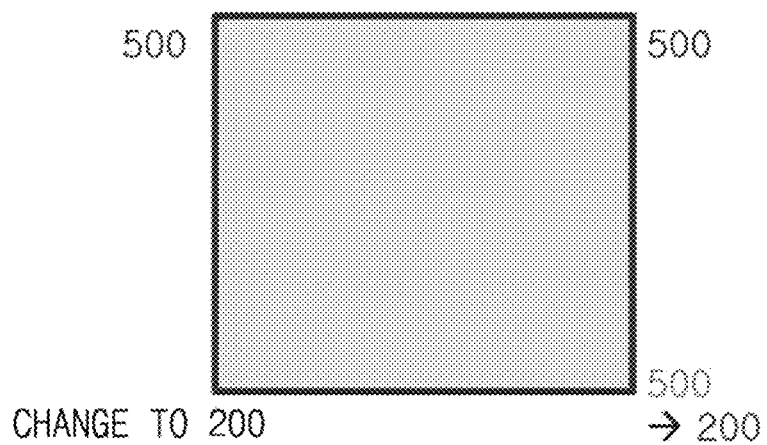

As illustrated in FIG. 6C, when the braking force of the rear-left wheel of the vehicle is changed to 200 N, to uniformly adjust the braking force of the front wheels and the rear wheels of the vehicle, the braking force of the rear-right wheel of the vehicle is decreased to 200 N.

Figure 6D:
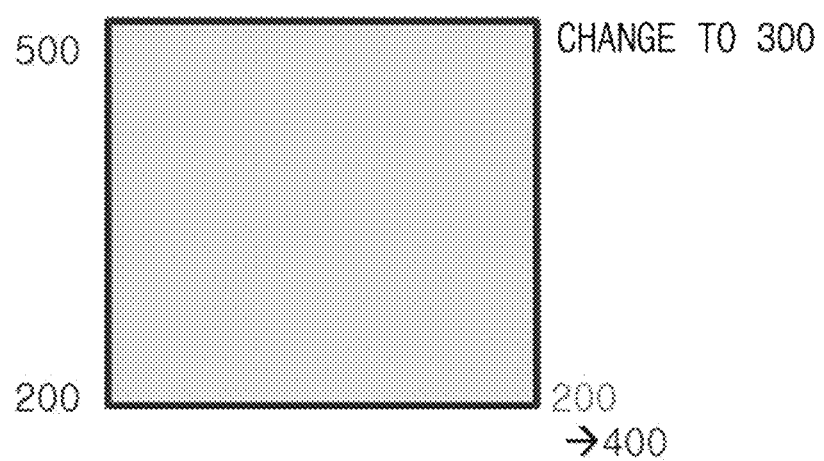

As illustrated in FIG. 6D, when the braking force of the front-right wheel of the vehicle is changed to 300 N, to uniformly adjust the braking force of the right wheels and the left wheels of the vehicle, the braking force of the rear-right wheel of the vehicle is decreased to 400 N.

Accordingly, according to the control method of the present invention, the braking force of the other wheel is added or decreased based on the wheel of which the braking force is limited to prevent the vehicle from sliding or yaw moment in general.

In the meantime, operations S17 to S25 correspond to the object fall-down preventing step S2.

Next, the controller 10 determines whether a locking phenomenon occurs in any one wheel (S26).

When the locking phenomenon occurs in any one wheel in operation S26, the controller 10 re-calculates weight of the object having correlation with the wheel in which the corresponding locking phenomenon occurs (S27), and determines the amount of distribution of the braking force for each wheel to prevent the locking phenomenon from occurring in the wheel (S28).

In the meantime, operations S26 to S28 correspond to the recalculating step S3.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable"

signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A control method for distribution of braking force of a vehicle, the control method comprising:
    performing a vertical load determination step in which a controller is configured to recognize an object existing in an interior of the vehicle and to recognize data of at least one among a position in the vehicle, a size, volume, density, weight, and center of gravity of the corresponding object, and to determine a vertical load applied to each wheel of the vehicle according to the recognized data,
    wherein the controller is configured to transmit data of the determined vertical load of each wheel to a brake controller electrically connected to the controller, and the brake controller is configured to determine an amount of the distribution of the braking force for each wheel of the vehicle according to the received data of the vertical load and to drive a brake actuator electrically connected to the brake controller according to the determined amount of the distribution of the braking force,
    wherein the control method further includes:
    an object fall-down preventing step, in which the controller is configured to recognize an object existing in the interior of the vehicle by use of an indoor camera, and when the recognized object is an object having a possibility of falling-down, the controller is configured to control acceleration and deceleration of the vehicle to prevent the corresponding object from falling down from an original position thereof.

2. The control method of claim 1,
    wherein the controller is configured to recognize whether a predetermined content received in the object existing inside the vehicle overflows from the object, and
    wherein the controller is configured to determine the acceleration and the deceleration of the vehicle to prevent the predetermined content from overflowing from the object, and to determine braking force of each wheel of the vehicle according to the determined acceleration and the determined deceleration.

3. The control method of claim 1, further including:
    performing a re-determination step, in which when a locking phenomenon occurs in at least one wheel of the vehicle while the vehicle travels, the controller is configured to re-recognize data of a weight of an object that affects the vertical load of the corresponding wheel, to determine a vertical load applied to each wheel of the vehicle according to the re-recognized weight of the corresponding object, to determine the amount of distribution of the braking force for each wheel to prevent the locking phenomenon from occurring in the corresponding wheel, and to drive the brake actuator according to the determined amount of the distribution of the braking force.

4. The control method of claim 3, wherein the vertical load determination step includes:
    operation in which the controller is configured to determine whether the position of the object existing in the interior of the vehicle is changed or a new object is added in the vehicle when the vehicle starts,
    operation in which when the controller concludes that the position of the object existing in the interior of the vehicle is not changed or the new object is not added, the controller is configured to read a most recent data of the vertical load of each wheel stored in a memory;
    operation in which when the controller concludes that the position of the object existing in the interior of the vehicle is changed or the new object is added, the controller is configured to recognize data of positions, weights, and centers of gravity in the vehicle for all objects existing in the interior of the vehicle, and to determine the vertical load applied to each wheel of the vehicle according to the recognized data;
    operation in which the controller is configured to determine a limit value of the braking force of each wheel of the vehicle according to the determined vertical load for each wheel;
    operation in which the controller is configured to determine whether an object among all the objects located inside the vehicle moves while the vehicle travels; and
    operation in which when the controller concludes that the object moves while the vehicle travels, the controller is configured to recognize data of positions, weights, and centers of gravity in the vehicle for all the objects existing in the interior of the vehicle, to re-determine the vertical load applied to each wheel of the vehicle according to the recognized data, and to re-determine a limit value of the braking force of each wheel of the vehicle according to the vertical load.

5. The control method of claim 4, wherein the object falling-down preventing step includes:
    operation in which when the controller concludes that the object does not move when the vehicle travels, the controller is configured to determine whether there is an object having a possibility of falling down in the interior of the vehicle among all the objects by use of the indoor camera;
    operation in which when the controller concludes that there is the object having the possibility of falling down, the controller is configured to receive a sensor signal of an acceleration sensor and to determine whether the acceleration or the deceleration of the vehicle occur;
    operation in which when the controller concludes that the acceleration or the deceleration of the vehicle occurs, the controller is configured to determine whether shaking of the object has occurred due to the acceleration or the deceleration of the vehicle;
    operation in which when the controller concludes that the shaking of the object has occurred due to the acceleration or the deceleration of the vehicle, the controller is configured to reduce at least one of an acceleration limit value which is a predetermined limit value of the acceleration and a deceleration limit value which is a predetermined limit value of the deceleration;

operation in which when the controller concludes that the shaking of the object does not occur due to the acceleration or the deceleration of the vehicle, the controller is configured to determine whether the acceleration of the vehicle exceeds the predetermined acceleration limit value or the deceleration of the vehicle exceeds the predetermined deceleration limit value;

operation in which when the controller concludes that the acceleration of the vehicle exceeds the predetermined acceleration limit value or the deceleration of the vehicle exceeds the predetermined deceleration limit value, the controller is configured to increase the predetermined acceleration limit value or the predetermined deceleration limit value;

operation in which after the predetermined acceleration limit value or the predetermined deceleration limit value is reduced or the predetermined acceleration limit value or the predetermined deceleration limit value is increased, the controller is configured to determine whether a content contained in the object that has the possibility of falling down in the interior of the vehicle is poured;

operation in which when the controller concludes that the content is poured from the object, the controller is configured to reduce the predetermined acceleration limit value or the predetermined deceleration limit value; and operation in which the controller is configured to determine the amount of distribution of the braking force of the wheel according to at least one of the reduced acceleration limit value, the reduced deceleration limit value, and the limit value of the braking force.

6. The control method of claim 5, wherein the re-determination step includes:

operation in which the controller is configured to determine whether the locking phenomenon occurs in the at least one wheel of the vehicle;

operation in which when the controller concludes that the locking phenomenon occurs in the at least one wheel, the controller is configured to re-determine weight of an object having correlation with a wheel in which the corresponding locking phenomenon occurs; and operation in which the controller is configured to determine an amount of distribution of the braking force for each wheel to prevent the locking phenomenon from occurring in the wheel in which the corresponding locking phenomenon occurs.

7. A non-transitory computer readable storage medium on which a program for performing the method of claim 1 is recorded.

8. An apparatus of controlling distribution of braking force in a vehicle, the apparatus comprising:

an indoor camera provided in the vehicle to capture an image of an interior of the vehicle;

an external camera provided on the vehicle to capture an image of an external environment outside the vehicle;

an acceleration sensor measuring an acceleration and a deceleration of the vehicle;

a brake actuator which operates a brake of the vehicle, and a controller electrically connected to the indoor camera, the external camera, the acceleration sensor and the brake actuator, wherein the controller is configured for performing a vertical load determination step in which the controller is configured to recognize an object existing in the interior of the vehicle and to recognize data of at least one among a position in the vehicle, a size, volume, density, weight, and center of gravity of the corresponding object, and to determine a vertical load applied to each wheel of the vehicle according to the recognized data, wherein the controller is configured to determine an amount of the distribution of the braking force for each wheel of the vehicle according to the recognized data of the vertical load and to drive the brake actuator according to the determined amount of the distribution of the braking force, and wherein the controller is configured for performing an object fall-down preventing step, in which the controller is configured to recognize an object existing in the interior of the vehicle by use of the indoor camera, and when the recognized object is an object having a possibility of falling-down, the controller is configured to control the acceleration and the deceleration of the vehicle to prevent the corresponding object from falling down from an original position thereof.

9. The apparatus of claim 8, wherein the controller is configured to recognize whether a predetermined content received in the object existing inside the vehicle overflows from the object, and wherein the controller is configured to determine the acceleration and the deceleration of the vehicle to prevent the predetermined content from overflowing from the object, and to determine braking force of each wheel of the vehicle according to the determined acceleration and the determined deceleration.

10. The apparatus of claim 8, the controller is configured for:

performing a re-determination step, in which when a locking phenomenon occurs in at least one wheel of the vehicle while the vehicle travels, the controller is configured to re-recognize data of a weight of an object that affects the vertical load of the corresponding wheel, to determine a vertical load applied to each wheel of the vehicle according to the re-recognized weight of the corresponding object, to determine the amount of distribution of the braking force for each wheel to prevent the locking phenomenon from occurring in the corresponding wheel, and to drive the brake actuator according to the determined amount of the distribution of the braking force.

11. The apparatus of claim 10, wherein in the vertical load determination step, the controller is configured:

to determine whether the position of the object existing in the interior of the vehicle is changed or a new object is added in the vehicle when the vehicle starts, when the controller concludes that the position of the object existing in the interior of the vehicle is not changed or the new object is not added, to read a most recent data of the vertical load of each wheel stored in a memory;

when the controller concludes that the position of the object existing in the interior of the vehicle is changed or the new object is added, to recognize data of positions, weights, and centers of gravity in the vehicle for all objects existing in the interior of the vehicle, and to determine a vertical load applied to each wheel of the vehicle according to the recognized data;

to determine a limit value of the braking force of each wheel of the vehicle according to the determined vertical load for each wheel;

to determine whether an object among all the objects located inside the vehicle moves while the vehicle travels; and when the controller concludes that the object moves while the vehicle travels, recognize data of positions, weights, and centers of gravity in the vehicle for all the objects existing in the interior of the vehicle, to re-determine a vertical load applied to each wheel of the vehicle according to the recognized data, and to re-determine a limit value of the braking force of each wheel of the vehicle according to the vertical load.

12. The apparatus of claim 11, wherein controller is configured:

when the controller concludes that the object does not move when the vehicle travels, to determine whether there is an object having a possibility of falling down in the interior of the vehicle among all the objects by use of the indoor camera;

when the controller concludes that there is the object having the possibility of falling down, to receive a sensor signal of the acceleration sensor and to determine whether the acceleration or the deceleration of the vehicle occur;

when the controller concludes that the acceleration or the deceleration of the vehicle occurs, to determine whether shaking of the object has occurred due to the acceleration or the deceleration of the vehicle;

when the controller concludes that the shaking of the object has occurred due to the acceleration or the deceleration of the vehicle, to reduce at least one of an acceleration limit value which is a predetermined limit value of the acceleration and a deceleration limit value which is a predetermined limit value of the deceleration;

when the controller concludes that the shaking of the object does not occur due to the acceleration or the deceleration of the vehicle, to determine whether the acceleration of the vehicle exceeds the predetermined acceleration limit value or the deceleration of the vehicle exceeds the predetermined deceleration limit value;

when the controller concludes that the acceleration of the vehicle exceeds the predetermined acceleration limit value or the deceleration of the vehicle exceeds the predetermined deceleration limit value, to increase the predetermined acceleration limit value or the predetermined deceleration limit value;

after the predetermined acceleration limit value or the predetermined deceleration limit value is reduced or the predetermined acceleration limit value or the predetermined deceleration limit value is increased, to determine whether a content contained in the object that has the possibility of falling down in the interior of the vehicle is poured;

when the controller concludes that the content is poured from the object, to reduce the predetermined acceleration limit value or the predetermined deceleration limit value; and to determine the amount of distribution of the braking force of the wheel according to at least one of the reduced acceleration limit value, the reduced deceleration limit value, and the limit value of the braking force.

13. The apparatus of claim 12, wherein in the re-determination step, the controller is configured:

to determine whether the locking phenomenon occurs in the at least one wheel of the vehicle;

when the controller concludes that the locking phenomenon occurs in the at least one wheel, to re-determine weight of an object having correlation with a wheel in which the corresponding locking phenomenon occurs; and to determine an amount of distribution of the braking force for each wheel to prevent the locking phenomenon from occurring in the wheel in which the corresponding locking phenomenon occurs.

\* \* \* \* \*